United States Patent [19]

Baghdachi et al.

[11] Patent Number: 5,272,224

[45] Date of Patent: * Dec. 21, 1993

[54] POLYURETHANE BASED ADHESION COMPOSITION AND METHOD

[75] Inventors: Jamil Baghdachi, Northville; Keith H. Mahoney, Grosse Pointe Park, both of Mich.

[73] Assignee: Adco Products, Inc., Michigan Center, Mich.

[*] Notice: The portion of the term of this patent subsequent to Sep. 4, 2007 has been disclaimed.

[21] Appl. No.: 717,740

[22] Filed: Jun. 19, 1991

Related U.S. Application Data

[63] Continuation-in-part of Ser. No. 530,951, May 30, 1990, abandoned.

[51] Int. Cl.$^5$ .................................................. C08F 8/32
[52] U.S. Cl. ..................................... 525/460; 524/188; 524/730; 528/28; 528/34
[58] Field of Search ............... 525/460; 528/34, 28; 524/188, 730

[56] References Cited

U.S. PATENT DOCUMENTS

| | | | |
|---|---|---|---|
| 4,345,053 | 8/1982 | Rizk et al. | 525/540 |
| 4,687,533 | 8/1987 | Rizk et al. | 528/28 |
| 4,889,903 | 12/1989 | Baghdachi | 528/17 |
| 4,894,426 | 1/1990 | Baghdachi et al. | 528/22 |
| 4,954,598 | 9/1990 | Baghdachi et al. | 528/22 |
| 5,147,927 | 9/1992 | Baghdachi | 524/710 |

Primary Examiner—Melvyn I. Marquis
Assistant Examiner—D. Aylward
Attorney, Agent, or Firm—Killworth, Gottman, Hagan & Schaeff

[57] ABSTRACT

A one-component, moisture-curable polyurethane-based adhesive composition useful for affixing glass panels directly to electrocoat painted metal substrates or over a primer comprises a polyurethane base polymer containing an electrocoat adhesion promoter. The sealant composition has fast cure times at ambient temperatures and forms a strong bond directly to electrocoat painted metal substrates without the need for a sealant primer.

14 Claims, No Drawings

POLYURETHANE BASED ADHESION COMPOSITION AND METHOD

This application is a continuation-in-part of Ser. No. 07/530,951, filed May 30, 1990, now abandoned.

This invention relates to one component, moisture-curable polymeric sealant compositions and methods for their use. More particularly, this invention is directed to one component, moisture-curable sealant compositions useful for adhering window glass to a substrate treated with electrocoat coatings with and without the use of a primer.

The present invention is directed to one component, moisture-curable sealant compositions comprising:

a) a silane-terminated polyurethane polymer of the formula:

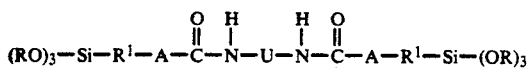

wherein U comprises a polyurethane containing at least two urethane linkages per molecule;

R is a lower alkyl of from 1 to 6 carbon atoms;

$R^1$ is a divalent bridging radical selected from the group consisting of divalent hydrocarbon radicals, divalent hydrocarbon ether radicals, and divalent hydrocarbon amino radicals;

A is selected from the group consisting of —S— and —$NR^2$— where $R^2$ is selected from the group consisting of hydrogen and an alkyl of from one to six carbon atoms; and b) an electrocoat adhesion promoter comprising a material selected from the group consisting of a compound having the structure

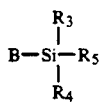

wherein $R^3$, $R^4$ and $R^5$ may be the same or different and are selected from alkyl and alkoxyl of from one to four carbon atoms, and x is an integer of from one to six. The group B is

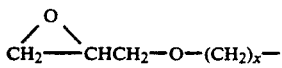

and/or $R^6$ where the group $R^6$ is

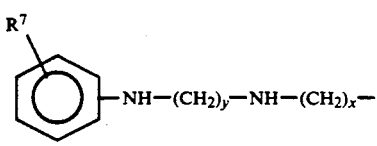

and/or $H_2N$—$(CH_2)_z$—NH—$(CH_2)_y$—NH—$(CH_2)_x$—. The group $R^7$ is alkyl of one to four carbon atoms or alkylene of one to four carbon atoms, and y and z may be the same or different and are integers of from one to six.

The sealant compositions may be applied over a primer or directly over electrocoat coating without the use of a primer.

The sealant composition of the present invention comprises a silane-capped polyurethane based polymer and from about 0.5 to about 10 parts by weight of an amino silane electrocoat adhesion promoter, based on 100 parts by weight of the base polyurethane polymer.

The sealant composition may further contain solvents, thixotropic agents, flexibilizing agents, fillers and pigmenting agents to obtain the desired color, consistency and flow characteristics.

Particularly suitable adhesion promoters include promoters selected from the group consisting of N-2(4-vinyl(benzeneamino))ethyl-3-aminopropyltrimethyoxysilane monohydrochloride, N-2-aminoethyl-N-3-aminoethyltrimethoxysilylpropyl-1,2-ethanediamine, gamma-glycidylpropyltrimethoxysilane, gamma-aminopropyltriethoxysilane including hydrohalide salts thereof and mixtures thereof, and mixtures of the immediately foregoing promoters with N-beta-amino-aminopropyl-trimethoxy-silane and/or gamma-aminopropyl-trimethoxy-silane. Also suitable as an adhesion promoter is a mixture of N-beta-aminoethyl-gamma-aminopropyl-trimethoxy-silane and gamma-aminopropyl-trimethoxy-silane.

The sealant compositions of the present invention comprise a base silane-capped polyurethane polymer having a number average molecular weight in the range of from about 10,000 to about 30,000 having the structure

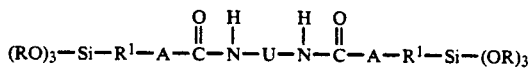

wherein u comprises a polyurethane containing at least two urethane linkages per molecule, and where R, $R^1$, and A are defined above. Such silane-capped polyurethane polymers are prepared by conventional polymerization techniques by reacting a polyether polyol having at least two free hydroxyl groups per molecule with an isocyanate compound having at least two isocyanate reactive groups per molecule as described in U.S. Pat. No. 3,979,344 to Bryant, et al which is incorporated herein by reference.

The polyether polyol and isocyanate compound are reacted in a weight ratio of about 8:1 to about 12:1, respectively. The starting polyether polyol preferably has a number average molecular weight of between about 1,000 and 5,000. One such preferred starting material is polypropylene glycol available as Polypropylene Glycol 2025 from Union Carbide Co., 270 Park Avenue, New York, N.Y. 10017.

The starting isocyanate compound may be selected from a variety of materials known in the art for such purposes, such as p-phenylene diisocyanate, biphenyl-4,4'-diisocyanate, toluene diisocyanate (TDI), 3,3'-dimethyl-4,4'-biphenylene diisocyanate, 1,4-tetramethylene diisocyanate, 1,6-hexamethylenediisocyanate, 2,2,4-trimethylhexane-1,6-diisocyanate, methylene bis-(phenyl isocyanate), 1,5-naphthalene diisocyanate, isophorone diisocyanate (IPDI), and methylene bis-(4-cyclohexylisocyanate). The preferred material is toluene diisocyanate.

The copolymer formed by reaction of these two monomers is end-capped with a silane group having the structure —A—$R^1$—Si—$(OR)_3$. The group A is sulfur, >NH, or an alkylamino group in which the alkyl portion contains from one to six carbon atoms. The bridging group $R^1$ may be a divalent hydrocarbon radical, a divalent hydrocarbon radical containing one or more oxygen ether linkages, or a divalent hydrocarbon radical containing one or more >NH linkages. The end-capping of the polyurethane polymer is achieved by including in the reaction mixture containing the polyether polyol and isocyanate compound an aminosilane compound such as gamma-aminopropyltrimethoxysilane, gamma-aminopropyltriethoxysilane, and N-beta-aminoethyl-gamma-aminopropyltrimethoxysilane (available as A 1110, A 1100, and A 1120, respectively, from Union Carbide Corp., 270 Park Ave., New York, N.Y. 10017).

As used throughout this specification and the appended claims, the term "alkyl" means a hydrocarbon residue derived from branched or unbranched alkane by removal of a single hydrogen atom. The term "alkoxyl" denotes alkyl groups attached through an oxygen ether linkage to the remainder of the parent molecule. The term "divalent hydrocarbyl" means a branched or unbranched hydrocarbon group derived by removal of two hydrogen atoms from a saturated or unsaturated acyclic hydrocarbon. The term "divalent hydrocarbyl" denotes a group derived from the removal of two hydrogen atoms from hydrocarbons containing one or more carbocyclic aromatic rings including phenyl, alkylphenyl, and phenylalkyl and the like. The term "divalent cyclohydrocarbyl" means a group derived by the removal of two hydrogen atoms from a carbocyclic non-aromatic hydrocarbon ring including cyclohexane, alkylcyclohexane, and the like.

The polyurethane base polymer is mixed with from about 2.0 to about 10.0 parts by weight, preferably from about 4.0 to about 8.0 parts by weight, (based on 100 parts by weight of the base polyurethane polymer) of an electrocoat adhesion promoting agent comprising an aminosilane, including hydrohalic salts thereof, of the structure:

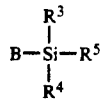

where B, x, $R^3$, $R^4$, and $R^5$ are as previously defined. By hydrohalic salts is meant the hydrofluoride, hydrochloride, hydrobromide, and hydroiodide salts, with the hydrochloride salts being preferred.

Preferred electrocoat adhesion promoters used for the purpose of this invention include N-betaaminoethyl-gamma-aminopropyltrimethoxysilane, gamma(-glycidoxy)propyltrimethoxysilane and N-2-aminoethyl-N-3-aminoethyltrimethoxy-silylpropyl-1,2-ethanediamine (available from Union Carbide Corp., 270 Park Ave., New York, N.Y. 10017) and N-2-[4-vinyl-(benzeneamino)]ethyl-3-aminopropyltrimethoxysilane monohydrochloride (available as Z-6032 from Dow Corning Co., Midland, Mich.).

The composition further includes from about 20 to about 50 parts by weight of a pigmenting agent and/or filler such as carbon black, from about 0.02 to about 0.2 parts by weight of a curing catalyst, and from about 0.3 to about 0.6 parts by weight of an accelerator, all weights based on 100 parts by weight of the capped polyurethane polymer.

Suitable curing catalysts for purposes of this invention include metallic salts of tin, lead, mercury, or Group VIII elements; organs-iron, organs-tin (IV) and organs-lead compounds; aliphatic or aromatic carboxylic acids; toluenesulfonic acid; salts of organic acids such as tin naphthenate, tin octoate, tin butyrate, dibutyl tin diacetate, dibutyltin dioctoate, dibutyltin dilaurate, iron stearate, or lead octoate; and organic amines such as trialkylamines, N-substituted piperidines, N,N'-substituted piperazines, and pyridine. The preferred curing catalyst for compositions of the present invention is dibutyltin diacetate.

Suitable accelerating agents for use in the compositions of the present invention are titanate esters of the type disclosed in U.S. Pat. Nos. 4,600,689 and 4,623,738, the contents of which are incorporated herein by reference. It is preferred that the titanate esters which are employed as accelerators possess at least one primary or secondary amine group per molecule. Preferred materials include (4-aminobenzene)sulfanato-O, bis-(dodecylbenzene)sulfanato-O, 2-propanolato titanium (IV) (KR ® 26S); 2-propanolato, tris-(3,6-diaza)hexanolato titanium (IV) (KR ® 44); 2,2-bis-(2-propenolatomethyl)butanolato, tris-(2-ethylenediamino)ethylato titanium (IV) (Lica ® 44); and 2,2-bis-(2-propenolatomethyl)butanolato, tris-(3-amino)phenylato titanium (IV) (Lica ® 97), commercially available from Kenrich Petrochemicals, Inc., 140 East 22nd Street, Bayonne, N.J. 07002. The preferred material is Lica ® 44.

Additionally, small amounts, ranging from about 0.25 to about 0.75 parts by weight, of a thixotropic agent per 100 parts by weight of polyurethane polymer may also be added to adjust the flow characteristics of the sealant composition. A typical thixotropic agent suitable for this purpose is Thixseal ® 1085 available from NL Chemicals, Inc., Heightstown, N.J. 08520.

Optionally, from about 1.0 to about 10.0 parts by weight of flexibilizing agent, preferably from about 2.0 to about 5.0 parts by weight, may be added to the composition, based on 100 parts by weight of the polyurethane base polymer. Suitable flexibilizing agents for inclusion in the compositions of the present invention include dioctyl phthalate, dibutyl phthalate, diundecyl phthalate (available under the Platinol ® line of plasticizers from BASF Corp., Paramus, N.J. 07652), and dioctyl adipate and butyl benzyl phthalate, iodecyldiphenyl phosphate (available as Santicizer ® 160 and 148, respectively, from Monsanto Chemical Co., St. Louis, Mo. 63166), N-butyl-p-toluenesulfonamide and N-ethyl-p-toluene-sulfonamide, (available as Ketjenflex ® 8 from Akzo Chemie America, 300 South Riverside Plaza, Chicago, Ill. 60606).

While not holding to one particular theory to the exclusion of others, it is believed that when the two above-named sulfonamides, either alone or in admixture, are used in the compositions, they function both to flexibilize the composition and to promote adhesion.

The composition may also optionally include from about 5 to about 20 parts by weight, preferably about 10 parts by weight of a silane- or silicone-surface-treated clay, per 100 parts by weight of the base polymer. Because normal clays (e.g., magnesium and aluminum silicates) contain particle surface hydroxyl groups which are reactive toward the polymeric components of the sealant composition, the clays useful in formulating the sealants of this invention must be surface treated to cap the otherwise reactive hydroxyl groups. This is accomplished by treating the clay with a trialkylsilyl chloride or trialkoxysilyl chloride or mixed tri(alkyl/alkoxy)silyl chloride such as trimethylsilylchloride, trimethoxysilyl chloride, methyldimethoxysilyl chloride and the like.

Commercially available silane- to silcone-surface-treated clays useful in the compositions of this invention include the CB, 5178, KE, and 2211 clays available from Burgess, P.O. Box 349, Sanderville, Ga. 31082.

In the method of the present invention a motor vehicle body, such as an automobile, truck or bus body which has been precleaned and/or surface pretreated (for example, by phosphatizing the metal surface), is coated with an electrocoat paint primer by conventional techniques well known in the art. This process is fully described, for example, in U.S. Pat. No. 4,575,523 to Anderson, et al., the contents of which are incorporated herein by reference. In general, the motor vehicle body to be electrocoated is connected to a direct current source in such a way that it acts as the cathode of an electrical circuit. The motor vehicle body is then immersed in a tank of a suitable aqueous electrodeposition bath which contains the counter electrode. The electrodeposition both comprises an aqueous dispersion of a thermosetting resin which deposits on the motor vehicle body as a result of the passage of current. When a sufficiently thick layer of electrocoat primer paint has been applied to the motor vehicle body, the body is removed from the tank, rinsed, and the layer of electrocoat paint cured to a smooth, hard, durable coating.

In the next step of the method of this invention, the regions of the motor vehicle body which are destined to receive a bead of fixed-window panel sealant are masked by the application of a masking means such as a strip of tape or strippable polymeric material.

The masked, electrocoated motor vehicle body is then further coated with one or more decorative and/or protective paint coatings by conventional means such as air-spraying, airless spraying, electrostatic spraying, dipping, or brushing. These decorative and/or protective coatings may take the form of one or more pigmented coating layers (topcoat system), or one or more thin, pigmented basecoat layers with one or more overlying layers of clear topcoat (basecoat/clearcoat coating system).

Following the application and curing of the decorative/protective coating layers, the masking means is removed from the motor vehicle body, and a bead of polyurethane-based sealant composition of this invention is applied directly to the electrocoat paint layer in this region of the motor vehicle body previously masked. In the final step, a fixed-window glass panel is pressed into contact with the sealant bead and the sealant is permitted to cure.

The following examples are provided to permit those skilled in the art to practice the present invention. The examples are merely illustrative and are not to be read as limiting the scope of the invention as defined by the appended claims.

| Preparation of the Polyurethane Base Polymer Composition | |
|---|---|
| A silane-capped polyurethane polymer of the type described in U.S. Pat. No. 3,632,557 was prepared as follows: | |
| A. Niax PPG 2025 ONE (2000 Molecular weight polyether polyol available from Union Carbide Corp., 270 Park Ave., New York, N.Y. 10017) | 2001.00 g |
| Hylene TM (80:20 Grade toluene diisocyanate available from E. I. duPont de Nemours & Co., Wilmington, DE 19898) | 204.00 g |
| Glacial acetic acid | 0.55 g |
| Dibutyltin diactate | 0.45 g |
| B. Anhydrous toluene | 110.00 g |
| C. Anhydrous toluene | 81.00 g |
| Silane A 1110 (gamma-Aminopropyl)trimethoxy silane available from Union Carbide Corp., 270 Park Ave., New York, N.Y. 10017 | 68.30 g |
| D. Anhydrous methanol | 273.00 g |

The components of A above were mixed and heated to 155° F. (68.3° C.) under anhydrous conditions and maintained at that temperature for fifty-five minutes. At the end of that time, B was added. Over the next forty-five minutes, the temperature of the mixture was gradually reduced to 105° F. (40.6° C.) and heating was continued for two and one-quarter hours. At the end of this time, C was added to the mixture and the resulting mixture was heated at 150°-165° F. (65.6°-73.9° C.) for an additional two and one-quarter hours. During this time, samples of the reaction mixture were tested for free isocyanate functional groups. When the tests indicated no residual free isocyanate, D was added and the mixture heated under reflux for a short time. The mixture was degassed and cooled to room temperature.

Preparation of Sealant Compositions of the Present Invention

Example 1

A five-gallon Myers mixer fitted with dual mixing blades was charged with 25 lb (11.34 kg) of the base polyurethane polymer prepared as described above. The mixer contents were heated to 65° C. and 1.32 lb (.60 kg) of the electrocoat adhesion promoter, N-2-[4-vinyl(benzeneamino)]ethyl-3-aminopropyltrimethoxysilane monohydrochloride (available as Z-6032 from Dow Corning Co., Midland, Mich.), 1.1 lb (0.5 kg) of anhydrous methanol, and 0.11 lb (0.5 kg) of neopentyl(-diallyl)-oxytri(N-ethyleneamino)ethyl titanate (available as LICA ® 44 from Kenrich Petrochemicals, Inc., 140 East 22nd Street, Bayonee, N.J. 07002) were added. This mixture was thoroughly blended by mixing for 10 minutes under slight vacuum.

To the above mixture was then added 12.0 g of dibutyl tin diacetate catalyst and mixing was continued for an additional 20 minutes under slightly reduced pressure. Carbon black (7.5 lb, 3.4 kg) and 2.5 lb (1.13 kg) of surface treated aluminum silicate clay (available from Burgess CB, P.O. Box 349, Sanderville, Ga. 31082) which had been previously dried to less than 0.05% by weight moisture content, were added to the sealant mixture and mixing was continued for an additional 45 minutes under slight vacuum The mixer contents were allowed to cool to room temperature and then packaged under anhydrous conditions. The final sealant had the following composition, normalized to 100 parts by weight of the base polyurethane polymer.

| Component | Grams | Parts by Weight Per 100 Parts of Base Polymer |
|---|---|---|
| Base polyurethane polymer | 11,340 | 100 |

-continued

| Component | Grams | Parts by Weight Per 100 Parts of Base Polymer |
|---|---|---|
| Adhesion promoter (Z-6032) | 600 | 5.30 |
| Methanol | 500 | 4.42 |
| LICA ® 44 | 50 | 0.44 |
| Dibutyltin diacetate | 12 | 0.11 |
| Carbon black | 3,400 | 29.98 |
| Surface treated aluminum silicate clay | 1,130 | 9.97 |

The black, homogeneous moisture-curable sealant composition had a viscosity of 60 seconds when extruded from a 0.104 inch (2.64 mm) orifice under a pressure of 60 psi (413.7 kPa) and 76° F. (24.4° C.).

Example 2

A sealant composition was prepared in accordance with the composition and method of Example 1, but containing a reduced amount (0.520 kg) of the electrocoat adhesion promoter N-2-aminoethyl-N-3-aminoethyltrimethoxysilylpropyl-1,2-ethylene diamine (A 1130). The composition had the following composition in parts by weight, normalized to 100 parts by weight of the base polyurethane polymer.

| Component | Grams | Parts by Weight, Per 100 Parts of Base Polymer |
|---|---|---|
| Base polyurethane polymer | 11,340 | 100 |
| Electrocoat adhesion promoter (A 1130) | 520 | 4.6 |
| Methanol | 500 | 4.41 |
| LICA ® 44 | 50 | 0.44 |
| Dibutyltin diacetate | 12 | 0.11 |
| Carbon black | 3,400 | 29.98 |
| Surface treated aluminum silicate clay | 1,130 | 9.96 |
| Flexibilizing agent (mixture of Sulfonamides) | 230 | 2.0 |

Example 3

A sealant composition was prepared in accordance with the composition and method of Example 1, but containing an increased amount (0.975 kg) of the electrocoat adhesion promoter A 1130. The composition had the following composition in parts by weight, normalized to 100 parts by weight of the base polyurethane polymer.

| Component | Grams | Parts by Weight Per 100 Parts of Base Polymer |
|---|---|---|
| Base polyurethane polymer | 11,340 | 100 |
| Electrocoat adhesion promoter (A 1130) | 800 | 7.1 |
| Methanol | 500 | 4.41 |
| LICA ® 44 | 50 | 0.45 |
| Dibutyltin diacetate | 12 | 0.11 |
| Carbon black | 3,400 | 29.98 |
| Surface treated aluminum silicate clay | 1,130 | 9.95 |
| Flexibilizing agent (diisodicylphthalate) | 30 | 2.0 |

Example 4

Following the method of Example 1, a sealant composition was prepared which further contained 0.5 lb (0.23 kg) of a 50/50 mixture of N-butyl-p-toluene-sulfonamide and N-ethyl-p-toluene-sulfonamide (available as Ketjenflex ® 8 from Akzo Chemie America, 300 South Riverside Plaza, Chicago, Ill. 60606) as a flexibilizing agent. The sealant had the following composition in parts by weight, normalized to 100 parts by weight of the base polyurethane polymer.

| Component | Grams | Parts by Weight Per 100 Parts of Base Polymer |
|---|---|---|
| Base polyurethane polymer | 11,340 | 100 |
| Electrocoat adhesion promoter (Z-6032) | 780 | 6.88 |
| Methanol | 500 | 4.42 |
| LICA ® 44 | 54 | 0.48 |
| Dibutyltin diacetate | 12 | 0.11 |
| Flexibilizing agent (Mixture of sulfonamides) | 230 | 2.03 |
| Carbon black | 3,400 | 29.98 |
| Surface treated aluminum silicate clay | 1,130 | 9.96 |

Example 5

A sealant composition was prepared in accordance with the composition and method of Example 1 but further containing 0.5 lb (0.23 kg) of a di-iso-decyl phthalate as a plasticizing agent. The sealant had the following composition in parts by weight, normalized to 100 parts by weight of the base polyurethane polymer.

| Component | Grams | Parts by Weight Per 100 Parts of Base Polymer |
|---|---|---|
| Base polyurethane polymer | 11,340 | 100 |
| Electrocoat adhesion promoter (Z-6032) | 780 | 6.88 |
| Methanol | 500 | 4.42 |
| LICA ® 44 | 50 | 0.44 |
| Dibutyltin diacetate | 12 | 0.11 |
| Flexibilizing agent (Di-iso-decylphthalate) | 230 | 2.03 |
| Carbon black | 3,400 | 29.98 |
| Surface treated aluminum silicate clay | 1,130 | 9.96 |

Example 6

A sealant composition was prepared in accordance with the composition and method of Example 1, but containing as the adhesion promoting agent a mixture of 0.50 lb (.230 kg) of N-2-aminoethyl-N-3-aminoethyl-trimethoxy-silylpropyl-1,2-ethanediamine and (available as A 1130 from Union Carbide Corp., 270 Park Avenue., New York, N.Y. 10017). The sealant had the following composition in parts by weight. normalized to 100 parts by weight of the base polyurethane polymer.

| Component | Grams | Parts by Weight Per 100 Parts of Base Polymer |
|---|---|---|
| Base polyurethane polymer | 11,340 | 100 |
| Electrocoat adhesion promoter (A 1130) | 230 | 2.03 |
| Methanol | 500 | 4.42 |
| LICA ® 44 | 50 | 0.44 |
| Dibutyltin diacetate | 12 | 0.11 |

-continued

| Component | Grams | Parts by Weight Per 100 Parts of Base Polymer |
|---|---|---|
| Carbon black | 3,400 | 29.98 |
| Surface treated aluminum silicate clay | 1,130 | 9.97 |

Example 7

A sealant composition was prepared in accordance with the composition and method of Example 1, but containing as the adhesion promoting agent 0.5 lb (0.23 kg) of N-2-aminoethyl-N-3-aminoethyltrimethoxy-silyl-propyl-1,2-ethanediamine (available as A 1130 from Union Carbide Corp., 270 Park Ave., New York, N.Y. 10017). The sealant had the following composition in parts by weight, normalized to 100 parts by weight of the base polyurethane polymer.

| Component | Grams | Parts by Weight Per 100 Parts of Base Polymer |
|---|---|---|
| Base polyurethane polymer | 11,340 | 100 |
| Electrocoat adhesion promoter (A 1130) | 230 | 2.03 |
| Methanol | 500 | 4.42 |
| LICA ® 44 | 50 | 0.44 |
| Dibutyltin diacetate | 12 | 0.11 |
| Carbon black | 3,400 | 29.98 |
| Surface treated aluminum silicate clay | 1,130 | 9.97 |

Example 8

A sealant composition was prepared in accordance with the method of Example 1, but with the following composition. The adhesion promoting agent used was 2.1 lb (0.95 kg) of gamma-(glycidoxy)propyltrimethoxysilane, available from Union Carbide Corp., 270 Park Ave., New York, N.Y. 10017). The sealant had the following composition in parts by weight, normalized to 100 parts by weight of the base polyurethane polymer.

| Component | Grams | Parts by Weight Per 100 Parts of Base Polymer |
|---|---|---|
| Base polyurethane polymer | 11,340 | 100 |
| Electrocoat adhesion promoter (Z-6040) | 950 | 8.38 |
| Methanol | 950 | 8.38 |
| LICA ® 44 | — | — |
| Dibutyltin diacetate | 12 | 0.11 |
| Carbon black | 3,400 | 29.98 |
| Surface treated aluminum silicate clay | 1,130 | 9.97 |

Example 9

A sealant composition was prepared in accordance with the method of example 1, but with the following composition. The adhesion promoting agent gamma-(glyciboxy)propyltenethoxysilane (Z 6040) available from Union Carbide Corp.; 270 Park Avenue, New York, N.Y. 10017. The sealant had the following composition in parts by weight, normalized to 100 parts by weight of the base polyurethane polymer.

| Component | Grams | Parts by Weight Per 100 Parts of Base Polymer |
|---|---|---|
| Base polyurethane polymer | 11,340 | 100 |
| Adhesion promoter (Z-6040) | 670 | 5.9 |
| Methanol | 500 | 4.4 |
| Dibutyltin diacetate | 12 | 0.11 |
| Carbon black | 3,400 | 29.98 |
| Surface treated aluminum silicate clay | 1,130 | 9.96 |
| Flexibilizing agent (Di-iso-decylphthalate) | 230 | 2.0 |

Testing Procedure

The lap shear strength of the materials prepared in accordance with the above examples were tested according to the following method. In each instance, pairs of shear strength test plates were prepared by bonding two previously electrocoat primed or topcoated steel plates, each 1 inch × 4 inches × .032 inches (2.54 cm × 10.16 cm × .081 cm) primed with the appropriate enamel primer and allowed to dry for the specified amount of time, with a sealant bead 1 inch long by 0.25 inches wide by 5/16 inches thick (2.54 cm × 0.64 cm × 0.79 cm). The sealant bead was applied along one of the one-inch edges of the test plates by means of a sealant tube. The plates were then pressed together so that the sealant bead was about 0.25 inches (0.64 cm) thick.

The sealant bead applied to the bonded test plates was allowed to cure at room temperature and 50% relative humidity for periods which varied between three hours and three days. After the appropriate cure time in each case, the shear strength of each sealant bead was tested on an Instron testing machine by pulling in a direction parallel to the faces of the bonded test plates. The results of these tests, along with the other properties of the tested compositions, appear in the following Table. Lap Shear Strength is measured in PSI.

| | Lap Shear Strength | | | | | |
|---|---|---|---|---|---|---|
| Example | 3 hr | 1 day | 2 day | 3 day | 7 day | Shore A |
| 1 | 90 | 275 | 490 | 845 | 900 | 61 |
| 2 | 75 | 235 | 460 | 790 | 890 | 58 |
| 3 | 97 | 240 | 430 | 825 | 910 | 56 |
| 4 | 105 | 290 | 470 | 875 | 920 | 59 |
| 5 | 100 | 285 | 495 | 895 | 940 | 60 |
| 6 | 110 | 300 | 460 | 900 | 930 | 52 |
| 7 | 95 | 265 | 450 | 845 | 900 | 62 |
| 8 | 60 | 200 | 375 | 600 | 795 | 51 |
| 9 | 55 | 190 | 350 | 575 | 800 | 48 |

We claim:

1. A one-component, moisture-curable sealant composition comprising
   a) a silane-terminated polyurethane polymer of the formula

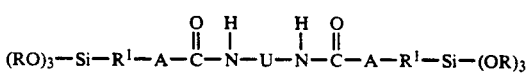

wherein U comprises a polyurethane containing at least two urethane linkages per molecule, prepared from polyether polyols having at least two free hydroxyl groups;

R is a lower alkyl of from 1 to 6 carbon atoms;

R¹ is a divalent bridging radical selected from the group consisting of divalent hydrocarbon radicals, divalent hydrocarbon ether radicals, and divalent hydrocarbon amino radicals;

A is selected from the group consisting of —S— and —NR²— where R² is selected from the group consisting of hydrogen and an alkyl of from one to six carbon atoms; and (b) a substituted silane electrocoat adhesion promoter comprising a silane compound of the formula $$\begin{array}{c} R^3 \\ | \\ B-Si-R^5 \\ | \\ R^4 \end{array}$$

wherein $R^3$, $R^4$ and $R^5$ may be the same or different and are selected from alkyl and alkoxyl of from one to four carbon atoms, and wherein B is at least one member selected from the group consisting of:

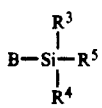

1)

$$CH_2\text{——}CHCH_2-O-(CH_2)_x-$$

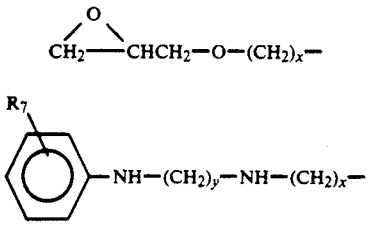

2)

and $$H_2N-(CH_2)_z-NH-(CH_2)_y-NH-(CH_2)_x-$$ 3)

wherein x is an integer of from one to six, wherein $R^7$ is an alkyl group of from one to four carbon atoms or alkylene of one to four carbon atoms, and wherein y and z may be the same or different and are integers of from one to six, said adhesion promoter being present in an amount between 2.0 and 8.5 parts by weight based on 100 parts of polyurethane polymer.

2. A one-component, moisture-curable sealant composition as defined in claim 1 wherein said polyurethane polymer comprises the reaction product of a polyether polyol containing at least two hydroxyl groups per molecule and a number average molecular weight of about 1000 to about 3000 and an isocyanate having at least two isocyanate groups per molecule.

3. A one-component, moisture-curable sealant composition as defined in claim 1, wherein said polyurethane polymer has a number average molecular weight of from about 10,000 to about 30,000.

4. A one-component, moisture-curable sealant composition as defined in claim 3 wherein A is —NR²— where R² is as defined therein.

5. A one-component, moisture-curable sealant composition as defined by claim 1 wherein said electrocoat adhesion promoter is present in an amount ranging from about 2.0 to about 10.0 parts by weight, based on 100 parts by weight of said polyurethane polymer.

6. A one-component, moisture-curable sealant composition as defined by claim 5 wherein said electrocoat adhesion promoter is present in an amount ranging from about 4.0 to about 8.0 parts by weight, based on 100 parts by weight of said polyurethane polymer.

7. A one component, moisture-curable sealant composition as defined by claim 5 wherein and electrocoat adhesion promoter is selected from the group consisting of gamma-(glycidoxy)propyltrimethoxysilane, N-2-aminoethyl-N-3-aminoethyl aminoethyltrimethoxy-silylpropyl-1,2-ethanediamine, and N-2-[4-vinyl-(benzeneamino)]ethyl-3-aminopropyltrimethoxysilane, including hydrohalide salts thereof and mixtures thereof.

8. A one-component, moisture-curable sealant composition as defined in claim 1 further comprising from about 1.0 to about 10.0 parts by weight of a flexibilizing agent, based on 100 parts by weight of said polyurethane polymer.

9. A one-component, moisture curable sealant composition as defined in claim 5 wherein said flexibilizing agent is present in an amount ranging from about 2.0 to about 5.0 parts by weight, based on 100 parts by weight of said polyurethane polymer.

10. A one-component, moisture-curable sealant composition as defined in claim 9 wherein said flexibilizing agent is selected from the group consisting of dioctyl phthalate, dibutyl phthalate, diundecyl phthalate, dioctyl adipate, butyl benzyl phthalate, iso-decyldiphenyl phosphate, di-iso-decyl phthalate, N-butyl-p-toluene-sulfonamide and N-ethyl-p-toluene-sulfonamide and mixtures thereof.

11. A one-component, moisture-curable sealant composition as defined in claim 1 wherein said electrocoat adhesion promoter is between N-2-[4-vinyl-benzeneamino)]ethyl-3-aminopropyltrimethoxysilane, monohydrochloride.

12. A one-component, moisture-curable sealant composition as set forth in claim 1 wherein said adhesion promoter comprises a mixture of N-2-aminoethyl-N-3-aminoethyltrimethoxy-silylpropyl-1,2-ethanediamine and N-beta-aminoethyl-gamma-aminopropyltrimethoxysilane.

13. A one-component, moisture-curable sealant composition as set forth in claim 1 wherein said adhesion promoter is N-2-aminoethyl-N-3 aminoethyltrimethyloxysilylpropyl-1,2-ethanediamine.

14. A one-component, moisture-curable sealant composition as set forth in claim 1 wherein said adhesion promoter is gamma-(glycidoxy)-propyltrimethoxysilane.

* * * * *